United States Patent [19]

Bhattacharyya et al.

[11] Patent Number: 5,591,418
[45] Date of Patent: Jan. 7, 1997

[54] PROCESS FOR REMOVING SULFUR OXIDES OR NITROGEN OXIDES FROM A GASEOUS MIXTURE

[75] Inventors: Alakananda Bhattacharyya, Wheaton; Michael J. Foral, Aurora; William J. Reagan, Naperville, all of Ill.

[73] Assignee: Amoco Corporation, Chicago, Ill.

[21] Appl. No.: 488,872

[22] Filed: Jun. 9, 1995

Related U.S. Application Data

[63] Continuation-in-part of Ser. No. 252,175, Jun. 1, 1994, Pat. No. 5,426,083.

[51] Int. Cl.$^6$ ..................................................... C01B 21/00
[52] U.S. Cl. .................................. 423/239.1; 423/244.01; 423/244.06; 95/135; 95/137; 95/136
[58] Field of Search ..................... 423/239.1, 244.01, 423/244.06; 95/135, 137, 148, 136

[56] References Cited

U.S. PATENT DOCUMENTS

| | | | |
|---|---|---|---|
| 3,835,031 | 9/1974 | Bertolacini et al. | 208/120 |
| 4,146,463 | 3/1979 | Radford et al. | 208/120 |
| 4,369,108 | 1/1983 | Bertolacini et al. | 208/120 |
| 4,472,267 | 9/1984 | Yoo et al. | 208/120 |
| 4,589,978 | 5/1986 | Green et al. | 208/113 |
| 4,626,419 | 12/1986 | Lewis et al. | 423/244 |
| 4,728,635 | 3/1988 | Bhattacharyya et al. | 502/304 |
| 4,774,212 | 9/1988 | Drezdon | 502/62 |
| 4,790,982 | 12/1988 | Yoo et al. | 423/239 |
| 4,798,819 | 1/1989 | Lewis et al. | 502/304 |
| 4,830,840 | 5/1989 | Bhattacharyya | 423/239 |
| 4,836,993 | 6/1989 | Bertolacini et al. | 423/244 |
| 4,843,168 | 6/1989 | Drezdon et al. | 558/357 |
| 4,866,019 | 9/1989 | van Broekhoven | 502/65 |
| 4,889,615 | 12/1989 | Chin et al. | 208/113 |
| 4,917,875 | 4/1990 | Moore et al. | 423/244 |
| 4,946,581 | 8/1990 | van Broekhoven | 208/120 |
| 4,952,382 | 8/1990 | van Broekhoven | 423/244 |
| 4,963,520 | 10/1990 | Yoo et al. | 502/64 |
| 4,973,399 | 12/1990 | Green et al. | 208/120 |
| 5,246,899 | 9/1993 | Bhattacharyya | 502/84 |
| 5,288,675 | 2/1994 | Kim | 502/65 |
| 5,302,188 | 4/1994 | Neal et al. | 95/34 |
| 5,383,955 | 1/1995 | Neal et al. | 95/34 |
| 5,426,083 | 6/1995 | Bhattacharyya et al. | 502/411 |

FOREIGN PATENT DOCUMENTS

| | | |
|---|---|---|
| 0318099 | 5/1989 | European Pat. Off. |
| 8706156 | 10/1987 | WIPO |
| 9110505 | 7/1991 | WIPO |

OTHER PUBLICATIONS

An article entitled "Hydrotalcite–type Anionic Clays: Preparation, Properties and Applications" by F. Cavani et al. which, at pp. 173–179, 201–211, and 281–285, appeared in *Catalysis Today* 11 (1991) Elsevier Science Publishers B.V. Amsterdam (no month).

An article entitled "Catalytic SOx Abatement" by A. Bhattacharyya et al. published in Ind. Eng. Chem. Res., 1988, 27, 1356–1360 (no month).

English–language translation of an article by Miyata et al. published in Nippon Kagaku Zasshi, 92 (No. 6), 514 (1971) (no month).

An Excerpt from *Studies in Surface Science and Catalysis* (vol. 76) –Fluid Catalytic–Cracking: Science and Technolgy –Chapter 14 entitled: "Additives for the Catalytic Removal of Fluid Catalytic Cracking Unit Flue Gas Pollutants" by Alak Bhattacharyya and Jin S. Yoo ©1993 Elsevier Science Publishers B.V., especially for pp. 551 to 555 (no month).

A copy of a letter accepting an abstract of a presentaion entitled: "Simultaneous Reduction of SOx and NOx from Fluid Catalytic Cracking Regenerator " to be delivered at the 1991 Fall Meeting of the Materials Research Society which presentation was orally delivered by Alak Bhattacharyya in Boton, Massachusetts on Dec. 4, 1991.

Excerpt from a trade magazine review entitled: "Environmental Processes '94" which appeared in *Hydrocarbon Processing* (Aug. 1994) at pp. 66–67.

Article by Otowa et al. entitled: "Dynamic Behaviour of an $SO_2$–Poisoned Catalyst in NO Reduction" appearing in *Applied Catalysis*, 18 (1985) pp. 47–55 Elsevier Science Publishers B.V., Amsterdam (no month).

Excerpt from an Article entitled: "Catalytic Reduction of Nitrogen Oxides –A Review on the Fundamentals and Technology" including Section 2.3 and Section 2.4 which appeared at pp. 390–401 *Catalysis Today* vol. 2 No. 4 (Apr. 1987).

*Primary Examiner*—Michael Lewis
*Assistant Examiner*—Thomas G. Dunn, Jr.
*Attorney, Agent, or Firm*—Robert A. Yesukevich; Richard A. Kretchmer

[57] ABSTRACT

A collapsed composition is described which is substantially composed of microcrystallites collectively of the formula:

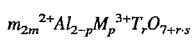

$$m_{2m}^{2+}Al_{2-p}M_p^{3+}T_rO_{7+r \cdot s}$$

where $M^{2+}$ is a divalent metal, $M^{3+}$ is a trivalent metal, and T is vanadium, tungsten, or molybdenum. The microcrystallites are so small as to be undetectable through conventional x-ray diffraction techniques, yet high resolution electron microscopy reveals that a substantial portion of the microcrystallites are composed of a solid solution having aluminum oxide molecularly dispersed in a divalent metal monoxide crystal structure. Another portion of the microcrystallites are constituted by a spinel phase. The collapsed composition is suitable as a sulfur oxide absorbent, having comparatively high capacity and comparatively fast absorption and desorption rates, and is also suitable as a nitrogen oxide reduction catalyst. The collapsed composition may be produced by heat treating a layered mixed hydroxide clay having interlayer anions in monometalate form. A sulfur oxide separation process is presented. A nitrogen oxide reduction process is also presented.

14 Claims, 4 Drawing Sheets

1

PROCESS FOR REMOVING SULFUR OXIDES OR NITROGEN OXIDES FROM A GASEOUS MIXTURE

This is a continuation-in-part of application Ser. No. 08/252,175 filed Jun. 1, 1994 now U.S. Pat. No. 5,426,083.

BACKGROUND OF THE INVENTION

I. Field of the Invention

The invention relates to anionic, hydrotalcite-type pillared clay compositions and their heat-treated derivatives. The invention also relates to a process for reducing the sulfur oxide content of a gaseous mixture by absorbing sulfur oxides on an absorbent which can be reactivated for further absorption through contact with a hydrocarbon in the presence of a hydrocarbon cracking catalyst. The invention additionally relates to a process for chemically converting a nitrogen oxide to produce nitrogen.

II. Description of the Prior Art

The development of efficient methods and catalysts for reducing the concentration of air pollutants, such as sulfur oxides and nitrogen oxides, in gaseous mixtures which result from the processing and combustion of sulfur-containing and nitrogen-containing fuels presents a major industrial problem which has interested researchers for a considerable time. For example, U.S. Pat. No. 3,835,031, issued to Bertolacini et al. and assigned to the assignee of the present application, describes a cyclic, fluidized catalytic cracking process operating with a catalyst comprising a molecular sieve in a silica-alumina matrix which is impregnated with one or more Group IIA metal oxides, such as magnesium oxide. By absorbing sulfur oxide within a regeneration zone and, subsequently, releasing the absorbed sulfur within a cracking reaction zone, emission of sulfur oxides in a regenerator stack gas stream is greatly reduced.

Other researchers have noted that absorbents containing rare earth metals are suitable for sulfur oxide removal service. U.S. Pat. No. 4,146,463, issued to Radford et al. and assigned to the assignee of the present invention, describes the absorption of sulfur oxides by modified catalyst particles containing the oxides of rare earth metals, such as cerium, lanthanum and neodyminium. The modified catalyst particles reportedly form non-volatile sulfur compounds by reacting with sulfur oxides in a regeneration zone.

Researchers have attempted to identify an optimal structure for sulfur oxides separation catalysts. U.S. Pat. No. 4,626,419, issued to Lewis et al., is directed to a composition of matter for removing sulfur oxides from gases which comprises an alkali metal and a crystalline rare earth oxide, such as cerium oxide, having a crystal size of less than about 90 Angstrom units. The '419 Patent states that improved results measured as a reduction of sulfur in regenerator off-gas may be obtained using oxide crystals in the specified size range.

Sulfur oxide separation catalysts containing magnesium and aluminum crystalline structures in spinel form are reported, for example, in U.S. Pat. No. 4,790,982, issued to Yoo et al., which describes the use of a magnesium and aluminum spinel in conjunction with cerium metal and free magnesia. U.S. Pat. No. 4,728,635, issued to Bhattacharyya et al., is directed to a process for the production of a calcined alkaline earth, aluminum-containing spinel composition for use as a sulfur oxide and nitrogen removal agent.

U.S. Pat. No. 4,865,019, issued to Van Broekhoven, describes sulfur-oxide absorbents which comprise an anionic clay having a hydrotalcite structure. The '019 Pat. states that the anionic clay can have a layered structure corresponding to a formula calling for divalent cations, trivalent cations, and anions in specified proportions. Preference is given to divalent cations $Mg^{2+}$ and trivalent cation $Al^{3+}$ alone or combined with $La^{3+}$ and/or $Ce^{3+}$. Anions $NO^{3-}$, $OH^-$, $Cl^-$, $Br^-$, $I^-$, $CO_3^{2-}$, $SO_4^{2-}$, $SiO_3^{2-}$, $CrO_4^{2-}$, $HPO_4^{2-}$, $MnO_4^-$, $HGaO_3^{2-}$, $HVO_4^{2-}$, $ClO_4^-$, $BO_3^{2-}$, monocarboxylates, dicarboxylates, alkyl sulfonates, and combinations thereof are listed as suitable. The '019 Patent states that the absorbents are useful after a heat treatment to a temperature in the range of about 300 to about 900 degrees C. which reportedly can involve some decomposition of the hydrotalcite structure.

U.S. Pat. No. 4,774,212, issued to Drezdon and assigned to the assignee of the present invention, describes magnesium and aluminum hydrotalcite-type clay compositions having polyoxometalates of vanadium, tungsten, or molybdenum as pillaring anions. The compositions are reported to have an x-ray diffraction d(003) value which is larger than that of typical hydrotalcites, indicating a greater spacing between clay layers. Reference is made to use of the compositions for catalysis at temperatures in the range of about 200 to about 600 degrees C. The '212 Patent also presents a method of preparing the described compositions which involves formulating hydrotalcite-like clays pillared by relatively large organic anions and replacing the organic anions with polyoxometalates from a solution having a pH of about 3 to about 6.

A direct and relatively simplified process for making anionic clays having a hydrotalcite structure pillared by pH-dependent inorganic anions is set forth in U.S. Pat. No. 5,246,899, issued to Bhattacharyya and assigned to the assignee of the present invention. In a preferred aspect, the process comprises adding a solution containing one or more selected divalent cations and one or more selected trivalent cations to an essentially carbonate-free solution which includes an inorganic ion and has a selectively chosen pH between about 6 and 14.

U.S. Pat. No. 5,288,675, issued to Kim, contemplates a $MgO/La_2O_3/Al_2O_3$ ternary oxide base wherein the MgO component is present as a microcrystalline phase which may be detected by x-ray diffraction. The ternary oxide base can reportedly be used in combination with ingredients such as ceria and/or vanadia to control sulfur oxide emissions. The '675 Patent states that the combination can be prepared by a multi-step process which includes reacting an aged, coprecipitated lanthanum and aluminum hydrous oxide slurry with a magnesium oxide slurry and a sodium hydroxide solution, calcining, impregnating with solutions of cerium and/or vanadium and calcining at a temperature of 450 degrees to 700 degrees C.

Sulfur oxide emissions from fluid catalytic cracking units, for example, are increasingly restricted by environmental regulations. The removal of sulfur oxide pollutants has been the subject of considerable attention for several years. One approach to reducing such emissions involves desulfurizing a hydrocarbon feed stream before it enters the cracking unit, so that a lesser amount of sulfur oxides are produced. Another approach is to scrub the emissions stream with an inexpensive alkaline material, such as lime or limestone. However, both of these approaches are relatively cumbersome and they create other waste disposal problems. Accordingly, separating the sulfur oxides by contact with a reusable absorbent presents an appealing alternative.

In addition to the search for optimal adsorbents, processes for removing sulfur oxides have received attention. U.S. Pat.

No. 4,917,875 issued to Moore et al. describes a cyclic continuous process in which hot adsorbent particles pick up sulfur oxides in a fluid transport riser. The particles are reportedly recycled to a desorber in which they are contacted at elevated temperature with a mixture of reducing gas and water vapor.

Nitrogen oxides are produced by at least two mechanisms relating to combustion. Oxidation of molecular nitrogen from combustion air leads to the formation of so-called "thermal NOx." Oxidation of nitrogen which is chemically bound in a combustible fuel and which is released during combustion generates "fuel NOx." Both mechanisms result in objectionable nitrogen oxide pollutants.

One approach to reducing the amount of nitrogen oxides emitted to the atmosphere reportedly involves adsorbing nitrogen oxides, and optionally sulfur oxides, on an adsorbent which is later regenerated by heating. For example, U.S. Pat. No. 5,383,955 issued to Neal et al. describes a process for removing NOx and SOx from flue gas utilizing a transport line adsorber. The '955 Patent states that the sorbent may be composed of a y-alumina substrate on which sodium is deposited.

Selective catalytic reduction is a known process in which nitrogen oxides are removed by injecting ammonia into a flue gas. The ammonia reportedly is injected into the flue gas upstream of a reactor operating in the range of 500 to 1100 degrees F. and containing base-metal oxides or zeolite-based formulations as catalyst. Handling and injecting ammonia, which is a relatively noxious and corrosive material, is a disadvantage of the selective catalytic reduction process. Additionally, when sulfur oxides are present in the flue gas, injection of ammonia can cause ammonium sulfate particulate formation which is problematical.

It is generally accepted that sulfur trioxide ($SO_3$) absorption proceeds more rapidly than sulfur dioxide ($SO_2$) absorption. Accordingly, efficient sulfur dioxide absorbents must perform at least three functions. First, desirable absorbents have a catalytic capability that allows them to enhance the reaction of sulfur dioxide with oxygen to form sulfur trioxide. Second, desirable absorbents are capable of binding sulfur trioxide in relatively large amounts. Third, desirable absorbents can desorb sulfur components comparatively quickly on exposure to hydrocarbons and cracking catalyst, or other reducing gas.

The sulfur oxide absorbents which have received the widest commercial acceptance to date in fluidized catalytic cracking units are based on spinel technology, most notably $MgAl_2O_4$ spinels combined with cerium oxide. Although the spinel and cerium absorbents are adequate for many purposes, they exhibit limited absorbent capacity and are prone to deactivation. In particular, free cerium oxide crystals present in the spinel and cerium absorbents tend to increase in size during normal operation so as to inhibit overall activity. Additionally, the spinel and cerium absorbents require more time for complete desorption than is available in some cyclic processing schemes.

Accordingly, a need still exists for new absorbents and processes which can absorb and desorb comparatively larger amounts of sulfur compounds per unit mass within relatively short cycle time periods. Catalytic materials on the new absorbents should be well dispersed for maximum accessibility and resist the tendency to agglomerate under operating conditions. Additionally, the new absorbents should resist physical attrition and demonstrate superior stability at processing temperatures in both oxidizing and reducing environments. Desirably, the new absorbents and processes are effective in reducing both nitrogen oxides and sulfur-oxides emissions.

SUMMARY OF THE INVENTION

The invention is a process utilizing an improved absorbent composition composed substantially of relatively small microcrystallites which demonstrate desirable sulfur oxide absorption capacity, comparatively fast sulfur oxide absorption and desorption rates, and catalytic activity for the chemical conversion of a nitrogen oxide to nitrogen. High resolution electron microscopy reveals that a substantial portion of the microcrystallites are essentially composed of a solid solution having impurities, such as aluminum oxide, dispersed in a monoxide of a divalent metal. The improved absorbent also includes spinel microcrystallites and trivalent metal oxide microcrystallites. The improved absorbent can be produced by heat treating layered mixed hydroxide compositions having interlayer anions in monometalate, dimetalate, trimetalate, or tetrametalate form. The invention is also a process which exploits the advantages of the improved absorbent for separating a sulfur oxide from a gaseous mixture and for chemically converting a nitrogen oxide to nitrogen.

In a preferred aspect, the invention is an anionic layered mixed hydroxide composition having the formula:

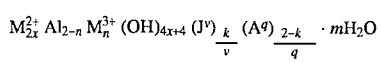

where $M^{2+}$ is a divalent metal selected from the group consisting of magnesium, calcium, zinc, barium, and strontium. $M^{3+}$ is a trivalent metal cation selected from the group consisting of cerium, lanthanum, iron, chromium, vanadium, and cobalt.

J is $VO_3$, $HVO_4$, $VO_4$, $V_2O_7$, $HV_2O_7$, $V_3O_9$, $V_4O_{12}$, $WO_4$ or $MoO_4$. A is selected from the group consisting of $CO_3$, OH, $SO_3$, $SO_4$, Cl, and $NO_3$. q and v are the net ionic charges associated with J and A, respectively. x is about 1.1 to about 3.5, while n is about 0.01 to about 0.4, m is a positive number.

In another preferred aspect, the invention is a composition suitable for use as a sulfur oxide absorbent. The absorbent comprises microcrystallites collectively of the formula:

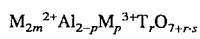

where $M^{2+}$ is a divalent metal, and $M^{3+}$ is a trivalent metal, as described above. T is vanadium, tungsten or molybdenum. p is about 0.01 to about 0.4, while r is about 0.01 to about 0.2. s is 2.5 when T is vanadium or 3 when T is tungsten or molybdenum. Each of the microcrystallite has a greatest linear dimension in the range of about 0.1 to about 30 nanometers. Moreover, a substantial portion of the microcrystallites of the invention are essentially composed of a solid solution phase having impurities, such as aluminum oxide or vanadium oxide, dispersed in a monoxide of the divalent metal. Another portion of microcrystallites are essentially composed of a spinel phase.

In yet another preferred aspect, the invention is a process for manufacturing a composition suitable for use as a sulfur oxide absorbent. In the process, water is blended with about two molar parts of a salt of a divalent metal selected from the group consisting of magnesium, calcium, zinc, strontium, and barium. Additionally, one molar part in sum of an aluminum salt and a selected trivalent metal is also blended in the mixture. The trivalent metal is selected from the group consisting of cerium, lanthanum, iron, chromium, vanadium and cobalt. A metalate salt in a quantity of about 0.1 to less than 2 molar parts is also blended into the mixture. The metalate salt contains an anionic species which is a vanadate, a tungstate, or a molybdate. In an especially preferred aspect, an alkalinity control agent is also blended into the mixture to stabilize the anion in an aqueous, dissociated form which contains but a single metal atom. Anions in such form are commonly described as monometalate. It is sometimes convenient to introduce the anions in solution form as a separate step after a precipitate has formed and has been calcined at least once.

The mixture is heated to a temperature in the range of about 50 degrees to about 100 degrees C. for at least about one hour and, thereafter, an anionic layered mixed hydroxide is recovered from the mixture. The recovered layered hydroxide is calcined for about one hour at a temperature of about 450 degrees C. or hotter to produce a partially collapsed and dehydrated composition suitable for use as a sulfur oxide absorbent or as a nitrogen oxide reductant. The collapsed composition is substantially composed of microcrystallites having a greatest linear dimension in the range of 0.1 to about 30 nanometers. The collapsed composition contains microcrystallites which are essentially composed of a solid solution phase having aluminum oxide or vanadium oxide dispersed in a monoxide of the divalent metal. The collapsed composition also contains microcrystallites which are essentially composed of a spinel phase.

In an additionally preferred aspect, the invention is a process for manufacturing a composition suitable for use as a sulfur oxide absorbent which comprises calcining a layered mixed hydroxide at a temperature of at least about 450 degrees C. for about one hour or more. The layered hydroxide is of the formula set forth above in regard to layered mixed hydroxides of the invention. The product of calcining is a collapsed composition substantially composed of microcrystallites, each of about 0.1 to about 30 nanometers in size. The microcrystallites are constituted by solid solution phase microcrystallites and by spinel phase microcrystallites, as described above.

Moreover, the invention is a process for separating sulfur oxides from gaseous mixtures. The process comprises absorbing sulfur oxides on a dehydrated and collapsed composition which is substantially composed of microcrystallites collectively of the formula set forth above with regard to collapsed compositions of the invention. The microcrystallites are of about 0.1 to about 30 nanometers. One portion of the microcrystallites is constituted by a solid solution phase and another portion of the microcrystallites is constituted by a spinel phase, as described above. The process additionally comprises desorbing sulfur dioxides from the absorbent by contacting the collapsed composition with a hydrocarbon in the presence of a cracking catalyst.

The invention is also a process for the cyclic fluidized catalytic cracking of a hydrocarbon feedstock containing organic sulfur compounds. The process comprises absorbing at least a portion of the sulfur oxides in a regeneration zone with a fluidizable particulate solid including a collapsed composition in accordance with the formula set forth above. The collapsed composition includes microcrystallites composed essentially of a solid solution phase having aluminum oxide dispersed in a monoxide of a divalent metal, as described above. The process further includes removing absorbed sulfur oxides from the particulate solid by exposing the particulate solid to the hydrocarbon feedstocks in the reaction zone.

In another preferred aspect, the invention is a process for reducing at least one of (1) the sulfur oxide content of a sulfur-oxide containing gas, and (2) the nitrogen oxide content of a nitrogen-containing gas, wherein the gas is contacted with a composition produced for the above-described process for manufacturing. In other preferred aspects, the invention is a process for separating sulfur oxides from a gaseous mixture and a process for the cyclic, fluidized catalytic cracking of a hydrocarbon feedstock including a nitrogen-containing gas or a sulfur containing compound.

DETAILED DESCRIPTION OF THE INVENTION

Figure 1:
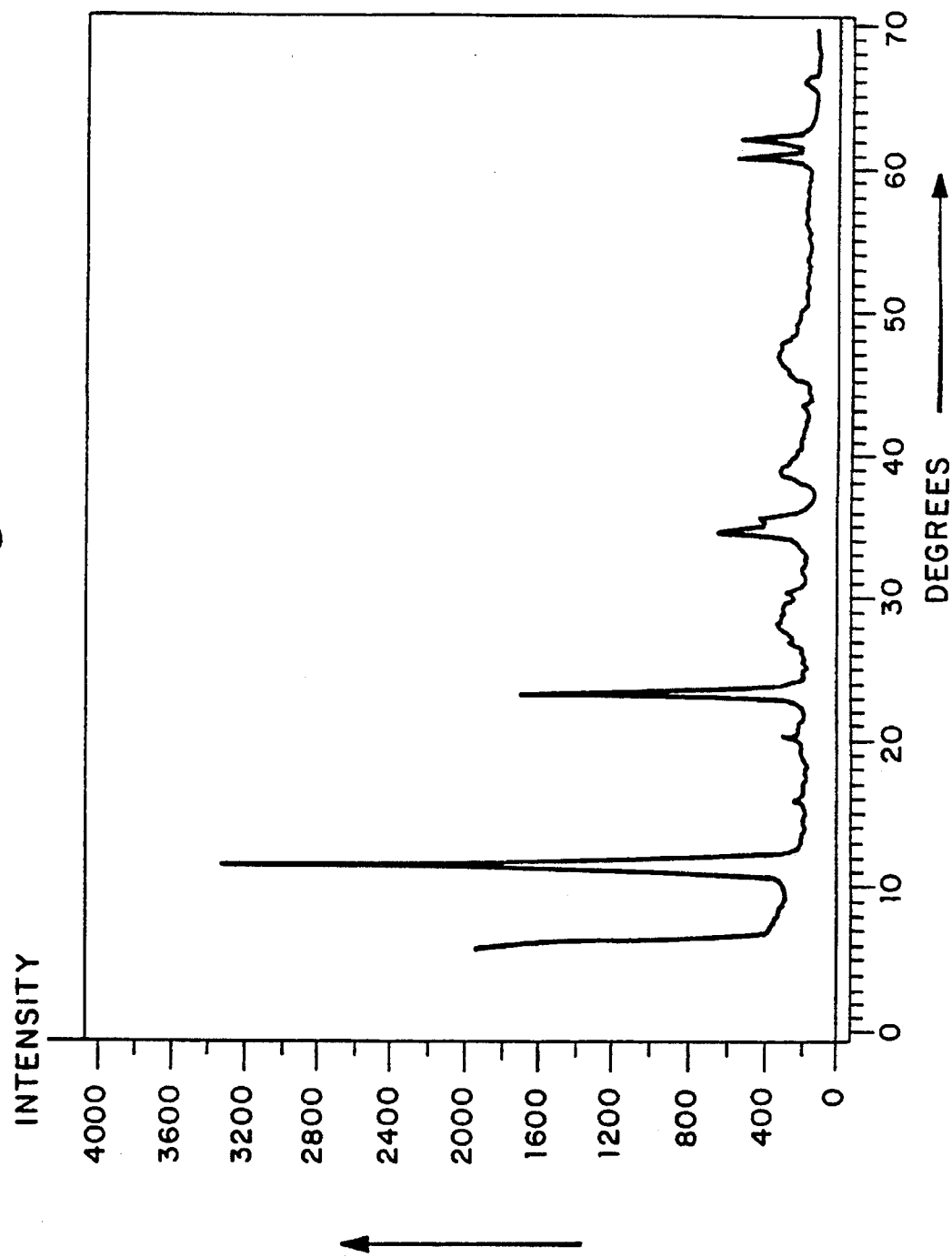
FIG. 1 is the trace of an x-ray diffraction analysis for the product of Example 1, showing a relationship between intensity and an angle (in degrees) that is characteristic of a mixed layered hydroxide structure having a d(001) value of 7.62 Angstroms units.

We have discovered that anionic layered mixed hydroxide compositions can be calcined to produce dehydrated and collapsed compositions having unique solid solution microcrystallites that are very suitable for use as sulfur oxide absorbents and, also very suitable for use as catalysts in the chemical conversion of nitrogen oxides to nitrogen and oxygen. The layered compositions will be described first.

Anionic layered mixed hydroxide compositions are layered in the sense that they are constituted by sheets of divalent and trivalent metal cations interposed between a larger number of hydroxide anions which are also in the sheets. They are mixed because divalent cations and trivalent cations are interspersed within the sheets. Water molecules and additional anions are located in interlayers between the sheets. When subjected to conventional x-ray diffraction analysis, the layered mixed hydroxide composition exhibits diffraction peaks whose positions can be correlated with the average distance between adjacent sheets.

In one aspect, the invention is an anionic layered mixed hydroxide composition of the formula:

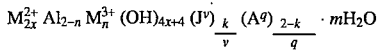
$$M^{2+}_{2x} Al_{2-n} M^{3+}_n (OH)_{4x+4} (J^{\nu})_{\frac{k}{\nu}} (A^q)_{\frac{2-k}{q}} \cdot mH_2O$$

In the formula, $M^{2+}$ is a divalent metal present as a cation having a valence of positive two which is coordinated with a plurality of hydroxide anions to form infinite sheets. The structure of the sheets resembles the structure of the naturally occurring mineral brucite, $Mg(OH)_2$. The divalent metal is preferably selected from the elements of Group IIA or IIB of the periodic table of the elements as depicted on the inside front cover of Perry's Chemical Engineers Handbook (6th Edition). More preferably, the divalent metal is selected from the group consisting of magnesium, calcium, zinc, strontium, and barium; most preferably from the group consisting of magnesium, calcium, and zinc.

The symbol $M^{3+}$ denotes a trivalent metal present as a cation of valence three. The trivalent metal is preferably selected from the group consisting of rare earth elements, iron, chromium, vanadium, and cobalt. More preferably, the trivalent metal is selected from the group consisting of cerium, lanthanum, iron, chromium, vanadium, and cobalt; most preferably cerium and lanthanum. The rare earth elements, also known as the lanthanide series elements, are often found as a naturally occurring mixture of two or more of the rare earth elements. It is contemplated that such mixtures of rare earth elements may be conveniently employed in the present invention.

x is about 1.1 to about 3.5; preferably about 1.5 to about 3.5; and more preferably about 2 to about 3. n is about 0.01 to about 0.4, more preferably about 0.2 to about 0.4. Al is the trivalent metal aluminum present as a trivalent cation coordinated with a plurality of hydroxide anions. Additionally, it is preferred that the molar ratio of the divalent metal to aluminum be about 1 to about 5, more preferably about 2 to about 3.

J is an anion selected from the group consisting of vanadates, tungstates and molybdates. Preferably, J is $VO_3$, $HVO_4$, $VO_4$, $V_2O_7$, $HV_2O_7$, $V_3O_9$, $V_4O_{12}$, $WO_4$ or $MoO_4$. More preferably, J is selected from the group consisting of monovanadates, specifically metavanadate ($VO_3$), orthovanadate, ($VO_4$) and protonated vanadate ($HVO_4$). Preferably, J is located primarily in interlayers between the sheets. v is the net anionic charge associated with J. For example, the net ionic charge associated with $VO_3^{1-}$ is $-1$. Similarly, the net ionic charge associated with $HVO_4^{2-}$ is $-2$.

A is a relatively small anion having a size approximately equal to or less than that of carbonate ($CO_3$). Preferably, A is selected from a group consisting of $CO_3$, $OH$, $SO_3$, $SO_4$, $Cl$, and $NO_3$. q is the net ionic charge associated with A. k is about 0.01 to less than 2.

m is a positive number quantitatively indicating the presence of water molecules. Preferably, substantially all of the water molecules are located in the interlayer. However, the formula presented is empirical and is not limited to any particular structure.

By way of comparison, the naturally occurring mineral hydrotalcite is a specific example of an anionic layered mixed hydroxide composition. However, the formula of hydrotalcite differs from the formula of the layered composition of the present invention in that the mineral hydrotalcite ordinarily contains substantially no divalent metals other than magnesium, substantially no trivalent metals other than aluminum, and substantially no anions other than carbonate.

The layered composition of the present invention exhibits an x-ray diffraction pattern when analyzed using conventional techniques, preferably an x-ray diffraction pattern including a d(001) value equal to or greater than about 7.6 Angstrom units. An especially preferred layered composition employs magnesium as the divalent metal, cerium as the trivalent metal, and a monovanadate as the anion J.

In another aspect, the invention is a dehydrated and at least partially collapsed composition suitable for use as a sulfur oxide removal catalyst. Preferably, the collapsed composition is prepared by heat treating the layered composition described above. Regardless of its source or method of preparation, the collapsed composition comprises microcrystallites which are collectively of the formula:

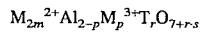

$$M_{2m}^{2+}Al_{2-p}M_p^{3+}T_rO_{7+r \cdot s}$$

In the formula, $M^{2+}$ is a divalent metal, Al is aluminum and $M^{3+}$ is a trivalent metal, as described above. T is vanadium, tungsten or molybdenum, preferably vanadium.

m is preferably about 1.1 to about 3.5, more preferably about 1.5 to about 3.5, and most preferably about 2 to about 3. p is about 0.01 to about 0.4, preferably about 0.2 to about 0.4. It is preferred that the molar ratio of the divalent metal to aluminum be about 1 to about 5, more preferably about 2 to about 3.

r is about 0.01 to about 0.2, preferably about 0.05 to about 0.2. In the algebraic expression communicating the subscript for O in the above formula, r is multiplied times s. s is 2.5 when T is vanadium, but s is 3 when T is tungsten or molybdenum.

Each of the microcrystallites of the invention has certain identifying characteristics. It is not necessary that every microcrystallite present in a composition possess these characteristics, but a substantial proportion of the microcrystallites must possess the characteristics in order to achieve the advantages offered by the invention.

First, the microcrystallites of the invention have a greatest linear dimension in the range of about 0.1 to about 30 nanometers, more preferably about 1 to about 20 nanometers and most preferably about 10 nanometers. The microcrystallites need not be spherical. For microcrystallites which are spherical, the greatest linear dimensions are the diameters.

Absorbents having microcrystallites with dimensions in the specified range are sometimes termed "amorphous," possibly because conventional x-ray diffraction analysis techniques are inadequate to detect the presence of their relatively small crystal structure. However, high resolution electron microscopy routinely detects microcrystallites in this size range. For the present purposes, high resolution electron microscopy is defined as electron microscopy capable of a point-to-point resolution of at least about 2.0 Angstrom units.

Such electron microscopy is also capable of detecting lattice planes in microcrystallites. A lattice plane is a regular geometrical arrangement of objects in space, such as atoms arranged in a crystalline structure, that is relatively flat in a given vicinity. When viewed on edge by appropriate electron microscopy techniques, the lattice planes appear as lines which can be curved or straight as well as continuous or discontinuous.

Additionally, the electron microscopy techniques can pinpoint the existence and location of individual lattice planes, the relative intensity of various lattice planes, and the spacing between adjacent lattice planes. Taken together, these observations of the crystal lattice, termed "lattice parameters," can be used to distinguish between two or more phases within a high resolution electron microscopes field of view. Herein, a phase is understood to be a homogeneous, physically distinct portion of matter present in a non-homogeneous physical-chemical system.

In practice, the lattice planes exhibit identifying lattice parameters, such as spacing, relative intensity, and periodic repetitions in spacing and intensity, which can be utilized to distinguish between phases. Once the presence of distinguishable phases has been determined, it may be necessary to carry out other types of analyses in order to precisely determine compositions of the phases. For example, scanning electron microscopy is often used to confirm the phase compositions.

Secondly, a substantial portion of the microcrystallites of the present invention are essentially composed of a solid solution phase in which an impurity, such as aluminum oxide ($Al_2O_3$) or vanadium oxide, is dispersed within a crystal lattice of a monoxide of a divalent metal, such as magnesium oxide (MgO). The dispersion is not merely a physical aggregation. Rather, the impurity is present as a dopant. The impurities are located so as to expand the crystal lattice of the divalent metal monoxide but not to disrupt the crystal lattice completely.

Another portion of the microcrystallites is composed essentially of a spinel phase. For example, the spinel phase may include a magnesium spinel such as $MgAl_2O_4$. Additionally, microcrystallites composed essentially of an oxide of the trivalent metal are preferably present.

The solution solid phase having aluminum oxide dispersed in a divalent monoxide crystalline structure is considered to be highly unusual. It is much more common to find relatively separate microcrystallites of aluminum oxide and the divalent monoxide together, with each microcrystallite containing but a single oxide. Accordingly, it is hypothesized that the presence of the solid solution phase of the present invention indicates a tendency to resist further division between the two phases. It is believed that the presence of the solid solution phase correlates with improved stability and activity under hydrocarbon processing conditions.

The divalent metal oxide phase can be selected from the Group IIA and Group IIB elements. Preferably the divalent metal is selected from the group consisting of magnesium, calcium, zinc, strontium, and barium, more preferably from the group consisting of magnesium, calcium and zinc. It is especially preferred that the divalent metal oxide phase be composed essentially of magnesium oxide.

The spinel phase is constituted by elements in crystalline spinel form, although the spinel may be present as microcrystallites too small to be detected by conventional x-ray diffraction analyses. The spinel structure is based on a cubic close packed array of oxide ions. Typically, the crystalline unit cell of the spinel structure contains 32 oxygen atoms. With regard to magnesium aluminum oxide spinel, there are 8 magnesium atoms and 16 aluminum atoms in each unit cell, corresponding to the formula $MgAl_2O_4$.

If oxide crystals of the trivalent metal described above are present, such as crystals of cerium oxide or lanthanum oxide, the trivalent metal oxide crystals each must be substantially in the form of microcrystallites having a greatest linear dimension in the range of about 0.1 to about 30 nanometers, preferably about 1 to about 20 nanometers. It is especially preferred that the trivalent metal be predominantly situated in relatively homogeneous microcrystallites of the present invention coexisting with solid solution microcrystallites and spinel microcrystallites.

It is hypothesized that the presence of the trivalent metal oxide phase with the other microcrystallites of the present invention provides a desirable degree of dispersion for the trivalent metal atoms and also tends to protect trivalent metal oxides molecules from attrition. Cerium oxide crystals standing alone, for example, have a tendency to disintegrate under the stresses of fluidized bed processing.

In another aspect, the invention is a process for manufacturing a composition suitable for use as a sulfur dioxide absorbent. A mixture is produced by blending water with about two parts by moles of a salt of a divalent metal selected from the group consisting of magnesium, calcium, zinc, strontium, and barium; preferably magnesium. Additionally, about one part by moles of the combined sum of an aluminum salt and a salt of a trivalent metal selected from the group consisting of cerium, lanthanum, iron, chromium, vanadium and cobalt is blended into the mixture. The sum is calculated by adding the molar amount of the aluminium salt to the molar amount of the trivalent metal salt and dividing the total by one-half of the molar amount of the divalent metal salt. Also blended in the mixture is about 0.01 to less than 2 molar parts of a metalate salt. The metalate salt of the present invention contains an anion which is a vanadate, a tungstenate or a molybdenate. Herein, salt is intended to mean a cation and an anion joined in an ionic bond. For convenience, we refer to solutions containing dissolved salts as salt solutions even though the ionic bonds have become dissociated.

In a preferred aspect, the process also includes blending into the mixture an appropriate amount of an alkalinity control agent to stabilize the anions in an aqueous, disassociated metalate form selected from the group consisting of monometalate, dimetalate, trimetalate, and tetrametalate anions. In an especially preferred aspect, the anions are monometalates which each contain exactly one metal atom. For example, $VO_3^{1-}$, $HVO_4^{-2}$, and $VO_4^{3-}$ represent anions which each contain exactly one metal atom. Allowance must often be made for losses of the alkalinity agent to precipitation. Stabilization of the metalate anion typically takes place in a liquid phase portion of the blended mixture.

For the present purposes, blending is understood to include methods wherein all of the described ingredients are blended simultaneously, and also to include methods wherein two or more of the ingredients are blended with each other and then blended with other ingredients. At each successive combination of ingredients, care must be taken to provide concentrations and alkalinities which tend to precipitate desired divalent metals and trivalent metals, as described above. The alkalinity of the mixture can also determine which forms of the anions are stabilized in solution and ultimately become components of the precipitates. It is often convenient to delay addition of the metalate anions until after a precipitate has formed and has been subjected to recovery and calcining.

The final choice of blending amounts and conditions is guided by the knowledge of previous practitioners in the art . For example, U.S. Pat. No. 5,246,899 and allowed U.S. patent application Ser. No. 08/093,768, which are herein incorporated in their entirety, contain useful teaching regarding pH-dependent anions and intercalating agents. Additionally, pages 181 through 182 of "The Early Transition Metals," by D. L. Kepert, Academic Press (New York) are recommended for information on stabilizing vanadate ions in solution.

In an especially preferred aspect of the process, the metalate salt contains a vanadate and is blended in an amount sufficient to produce a concentration of the vanadate in a liquid phase of the mixture which is in the range of about 0.01 to about 1 molar. Additionally, sufficient alkalinity control agent resides in the liquid phase of the mixture to produce an alkalinity in the range of about 6 to about 14 pH. The range of about 6 to about 8 pH is appropriate for $VO_3^{1-}$. The range of about 9 to 13 pH is appropriate for $HVO_4^{2-}$. The range of about 13 to about 14 is appropriate for $VO_4^{3-}$.

In this especially preferred aspect of the process, it is contemplated that about 50 percent or more of the vanadate ions dissolved in the liquid portion of the mixture are in a monometalate vanadate form, such as $HVO_4^{2-}$, $VO_4^{3-}$ or $VO_3^{1-}$. Because the metavanadate anion ($VO_3^{1-}$) and the orthovanadate anion ($VO_4^{3-}$) are stabilized at conditions which are inconsistent with the precipitation of many divalent metal hydroxides and trivalent metal hydroxides, it is often convenient to blend solutions containing these anions with the product of the recovery and the first calcination described above. Preferably, the product is calcined again after being exposed to the metalate salt solution.

The heated mixture is permitted to stand for at least about 1 hour, preferably at a temperature in the range of about 50 degrees to about 100 degrees C., more preferably about 75 degrees to 100 degrees C. Higher temperatures may be utilized provided that commensurately higher pressures exist to maintain at least a portion of the mixture in the liquid phase. An anionic layered mixed hydroxide, as described above, is recovered as a solid from the mixture. Appropriate recovery techniques include but are not limited to filtration, evaporation, fractional crystallization and spray drying.

The recovered layered mixed hydroxide is calcined for not less than about 1 hour at a temperature of about 450 degrees C. or hotter. Preferably the temperature is in the range of about 450 degrees to about 1000 degrees, more preferably about 450 degrees to about 850 degrees C. Herein, calcining refers to the heating of a solid in the presence of a gas, preferably a flowing gas. The gas may be air or, alternatively, a relatively inert gas, such as nitrogen, helium, or carbon dioxide. The recovered material may be calcined more than once, preferably before and after one or more exposures to a metalate salt solution as described above. The final calcining produces a dehydrated and collapsed composition suitable for use as a sulfur oxide absorbent.

The collapsed composition is dehydrated in the sense that it contains essentially no associated water molecules. Additionally, the sheets containing metal cations coordinated with hydroxide anions, as described above, are at least partially disrupted by the calcining and are in a condition conveniently termed "collapsed." Rather than having sheets of 400 nanometers or more in length as are typical of the layered mixed hydroxides, the collapsed composition is substantially composed of microcrystallites, each having a greatest linear dimension in the range of about 0.1 to about 30 nanometers. It is hypothesized that the microcrystallites are disintegrated and jumbled remnants of the layered mixed hydroxides which are believed to have at least partially collapsed when subjected to the calcining. Repeated calcination steps interspersed by contact with aqueous solutions are believed to repeatedly disrupt and reform the layered sheets so as to produce a final collapsed product having an excellent degree of microcrystallite dispersion.

In any event, the microcrystallites of the invention are relatively small and well dispersed so as to be accessible to reactants such as sulfur oxides. A substantial portion of the microcrystallites are constituted by a solid solution phase having aluminum oxide dispersed in a divalent metal monoxide. Another portion is constituted by a spinel phase. The phases contain lattice planes discernible by high resolution electron microscopy.

In yet another aspect the invention is a process for manufacturing a composition suitable for use as a sulfur oxide absorbent which comprises calcining a layered mixed hydroxide of the formula:

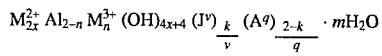

$$M^{2+}_{2x} Al_{2-n} M^{3+}_n (OH)_{4x+4} (J^v)_{\frac{k}{v}} (A^q)_{\frac{2-k}{q}} \cdot mH_2O$$

$M^{2+}$ is a divalent metal selected from the group consisting of magnesium, calcium, zinc, barium, and strontium. Divalent metals selected from the group consisting of magnesium, calcium, and zinc are preferable because in practice they more readily form sheets of metal cations coordinated with hydroxide anions, as described above. Magnesium is especially preferred as the divalent metal.

x is about 1.1 to about 3.5, preferably 1.5 to 3.5; n is about 0.01 to about 0.4, preferably about 0.1 to about 0.3. The trivalent metal, $M^{3+}$, is selected from the group consisting of cerium, lanthanum, iron, chromium, vanadium and cobalt, preferably the trivalent metal is cerium, lanthanum or iron.

J is a monomeric anion selected from the group consisting of $VO_3$, $HVO_4$, $VO_4$, $V_2O_7$, $HV_2O_7$, $V_3O_9$, $V_4O_{12}$, $WO_4$, and $MoO_4$; v is the net ionic charge associated with J; and k is about 0.01 to less than 2.

A is $CO_3$, OH, $SO_3$, $SO_4$, Cl, or $NO_3$; q is the net ionic charge associated with A; and m is a positive number.

The calcining is performed for about one hour or more at a temperature of at least about 450 degrees C., preferably a temperature in the range of about 450 degrees to about 1000 degrees, and more preferably a temperature in the range of about 450 degrees to about 850 degrees C. The calcining may be performed repeatedly, in two or more operations preferably interspersed by contacting with an aqueous metalate salt solution. The final calcining produces a dehydrated and collapsed composition, as described above.

In still another aspect, the invention is a process for separating sulfur oxides from a gas containing sulfur oxides which comprises absorbing sulfur oxides by exposing a gaseous mixture containing sulfur oxides to a dehydrated and collapsed composition, as described above. Herein the term "absorbing" is understood to include absorption, adsorption, imbibition, and chemisorption. The sulfur oxides include sulfur dioxide and sulfur trioxide. The absorbing causes the sulfur oxide to become associated with and remain in close proximity to the collapsed composition. It is not entirely clear whether the sulfur oxides are associated in the form of sulfur trioxide molecules, an anion containing sulfur and oxide, or some other chemical species.

The gaseous mixture from which sulfur oxides are removed need not contain molecular oxygen, but in a preferred aspect of the invention desirably contains an amount of molecular oxygen which is at least one half of, and which is more preferably in excess of the stoichometric amount required to convert any sulfur dioxide present to sulfur trioxide. The excess of molecular oxygen need not be large, but the ability of the absorbent of this invention to absorb sulfur dioxide is improved as the amount of excess molecular oxygen increases. Although the reason for this effect by molecular oxygen is uncertain, it is believed that increased concentrations of oxygen promote the conversion of sulfur dioxide to sulfur trioxide and assist in rejuvenating an oxidation function of the adsorbent. It is also believed that this sulfur trioxide is more easily absorbed by the absorbent than is the sulfur dioxide.

Preferably the molar percentage of molecular oxygen in the gaseous mixture containing sulfur oxides, based on the total moles of gas present, is about 0.1 to about 5 mole percent more preferably about 1 to about 3 mole percent, and most preferably about 2 mole percent. The molecular oxygen can either be inherently present in the sulfur oxide containing gaseous mixture or can be added. The absorption of sulfur oxides is desirably carried out at a temperature of about 100 degrees to about 900 degrees C., preferably at a temperature of about 300 degrees to about 900 degrees C. and most preferably at a temperature of about 450 degrees to about 800 degrees C.

The sulfur oxides are desorbed by contacting the collapsed composition with a hydrocarbon in the presence of a cracking catalyst at an elevated temperature. The temperature is desirably about 375 degrees to about 900 degrees C., preferably about 430 degrees to about 700 degrees C., and most preferably about 450 degrees to about 650 degrees C. Any hydrocarbon can be used to remove the absorbed sulfur oxides from the absorbent of this invention so long as it can be cracked by the cracking catalyst at the temperatures employed. Suitable hydrocarbons include, but are not limited to methane, natural gas, natural gas liquids, naphtha, light gas oils, heavy gas oils, wide-cut gas oils, vacuum gas oils, decanted oils, and reduced crude oils as well as hydrocarbon fractions derived from shale oils, coal liquefaction and the like; such hydrocarbons can be employed either singly or in any desired combination. Additionally, the sulfur oxides can be desorbed by contact with a reducing gas such as hydrogen.

Although the invention disclosed herein is not to be so limited, it is hypothesized that a chemical reaction occurs between the collapsed composition and the sulfur oxides which results in the formation of non-volatile inorganic sulfur compounds, such as sulfites and sulfates, at relatively high temperatures. These sulfites and sulfates can undergo partial decomposition to liberate the original sulfur oxides and collapsed composition. As a consequence of this reversal of the sulfur oxide absorption at high temperature, the absorption of sulfur oxides is desirably effected at a temperature below about 900 degrees C. and preferably below about 800 degrees C.

The precise mechanism by which absorbed sulfur oxides are removed from the collapsed composition is unknown, but it is believed that the combination of hydrocarbons and hydrocarbon cracking catalyst and elevated temperatures produces a reducing environment which effects a conversion of absorbed sulfur oxides to hydrogen sulfide while simultaneously reactivating the collapsed composition for further absorption of sulfur oxides. The removal of absorbed sulfur oxides from the collapsed composition is generally improved by contacting the collapsed composition with added steam either simultaneously with or subsequent to treatment with a hydrocarbon in the presence of a cracking catalyst.

The hydrogen sulfide which is produced during the removal of absorbed sulfur oxides from the collapsed composition can be converted to elemental sulfur by any of the conventional techniques which are well-known to the art as, for example, in a Claus Unit. Cracked hydrocarbon products which are produced during removal of absorbed sulfur oxides can be recycled for further use in removing absorbed sulfur oxides.

It is highly preferable that the process for separating sulfur oxides further comprise exposing a layered mixed hydroxide of the formula:

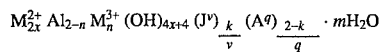

where $M^{2+}$ is a divalent metal selected from the group consisting of magnesium, calcium, and zinc;

x is about 1.1 to about 3.5;

n is about 0.01 to about 0.4;

$M^{3+}$ is a trivalent metal selected from the group consisting of cerium, iron, chromium, vanadium and cobalt;

J is $VO_3$, $HVO_4$, $V_2O_7$, $HV_2O_7$, $V_3O_9$, $V_4O_{12}$, $VO_4$, $WO_4$ or $MoO_4$;

v is the net ionic charge associated with J;

k is about 0.01 to less than 2;

A is selected from the group consisting of $CO_3$, OH, $SO_3$, $SO_4$, Cl, $NO_3$;

q is the net ionic charge associated with A; and m is a positive number, to the gaseous mixture containing sulfur oxides at a temperature in the range of about 450 degrees to about 1000 degrees C. to produce the collapsed composition described above.

Suitable cracking catalyst for use in the practice of this invention includes all high activity solid catalysts which are stable under the required conditions. Suitable catalysts include those of the amorphous silica-alumina type, having an alumina content of about 10 to about 30 weight percent. Catalysts of the silica magnesia type are also suitable which have a magnesia content of about 20 weight percent. Preferred catalysts include those of the zeolite-type which comprise from about 0.5 to about 50 weight percent and preferably about 1 to about 30 weight percent of a crystalline alumina silicate compound distributed through a porous matrix. Zeolite-type cracking catalysts are preferred because of their thermal stability and high catalytic activity.

The crystalline alumina silicate or zeolite component of the zeolite-type cracking catalyst can be of any type or combination of types, natural or synthetic, which is known to be useful in catalyzing the cracking of hydrocarbons. Suitable zeolites with various silica to alumina ratios include both naturally occurring and synthetic alumina silicate materials such as faujasite, chabazite, mordenite, Zeolite X, Zeolite Y, Zeolite beta, ZSM-5 and ultra-stable large pore zeolites. The zeolite-type cracking catalyst may be dispersed within a porous refractory material, natural or synthetic, which can be, for example, silica, alumina magnesia, boria, kieselguhr, diatomaceous earth, and mullite.

In the practice of this invention, the collapsed composition can be incorporated into or deposited onto a suitable support. Suitable supports include, but are not limited to, amorphous cracking catalyst, zeolite-type cracking catalyst, silica, alumina, mixtures of silica and alumina, magnesia, mixtures of silica and magnesia, kieselguhr, kaolin, and diatomaceous earth. Preferably the support is porous and has a surface area including the area of the pores open to the surface of at least about 10, preferably at least about 50, and most preferably about 100 square meters per gram.

A process for reducing at least one of (1) the sulfur oxide content of a sulfur-oxide containing gas, and (2) the nitrogen oxide content of the gas is a preferred aspect of the invention. In the process a composition produced by the above-described process for manufacturing is contacted with the gas at conditions effective to reduce the sulfur-oxide content or the nitrogen-oxide content. The effective conditions for reducing the sulfur oxide content are described above for absorption of sulfur oxides by exposing a gaseous mixture to a dehydrated and collapsed composition. The effective conditions for reducing the nitrogen oxide content include a temperature of about 200 to about 900 degrees C., more preferably about 260 to about 800 degrees C., and most preferably of about 300 to about 600 degrees C.

For nitrogen oxide content reduction alone, oxygen concentrations equal to or less than about 2 mole percent are preferred as they tend to stimulate greater nitrogen oxide removal activity. A complete absence of molecular oxygen is especially preferred for nitrogen oxide content reduction. Conversely, sulfur oxide content reduction alone appears to be favored by oxygen concentrations of about 2 mole percent or greater, preferably 5 mole percent or greater, as described above.

However, when optimal reduction of sulfur oxide content and nitrogen oxide content is desired, an oxygen concentration based on the total amount of the gases present of about 0.1 to about 5 mole percent, preferably about 1 to about 3 mole percent, and more preferably about 2 mole percent is recommended. It is especially preferred that the absorption of sulfur oxides and the conversion of nitrogen oxides to nitrogen and oxygen take place simultaneously in a dual-purpose reaction zone at conditions including a temperature in the range of about 200 to about 900 degrees C., more preferably about 260 to about 800 degrees C., and most preferably about 300 to about 600 degrees C.

It is hypothesized that the objectionable nitrogen oxides, such as nitrogen monoxide (NO), are reduced to nitrogen as a result of donating an oxygen atom to the dehydrated and at least partially collapsed composition of the present invention to form a relatively oxidized reaction intermediary. It is believed that the oxidized reaction intermediary subsequently liberates the oxygen atom by reacting with a reducing gas such as, for example, methane, hydrogen, carbon monoxide, sulfur dioxide, ammonia or the products of cracking hydrocarbons. Accordingly, it is preferred that such a reducing gas contact the dehydrated and partially collapsed composition either continuously or periodically at a rate and a concentration which provide an amount of reducing gas which is at least about one-half of, more preferably in excess of, the stoichiometric amount of reducing gas necessary to reduce the oxidized reaction intermediary. For the purpose of calculating the stoichiometric amount of reducing gas, it is assumed that all of the nitrogen oxides donate all of their oxygen atoms to form the reaction intermediary.

The instant process can be practiced with a stationary bed of particulate matter substantially composed of the above-described dehydrated and partially collapsed composition. Alternatively, the dehydrated and partially collapsed composition may be utilized as a fluidized bed. Preferably, the instant process is utilized as a continuous cyclic process in the manner described in U.S. Pat. No. 4,917,875 issued to Moore et al. which is now incorporated herein in its entirety, and especially for its teachings relating to continuously regenerating an adsorbent and recycling the adsorbent to an adsorber.

In the process for the cyclic, fluidized catalytic-cracking of a hydrocarbon feedstock including a nitrogen-containing organic carbon, the feedstock is preferably mingled with a particulate cracking catalyst in a reaction zone at a temperature in the range of about 430 degrees to about 730 degrees C. to produce cracked carbon and a coke. The coke contains relatively volatile components which are desirably elutriated from the cracking catalyst by exposure to a stripping gas stream, such as a stream of super-heated steam. The coke also contains relatively less volatile components and chemically bound nitrogen which are substantially eradicated from the cracking catalyst by burning in the presence of an oxidizing gas to produce a carbon oxide and a nitrogen oxide. Preferably, the burning takes place in a regeneration zone at a temperature of about 565 degrees to about 790 degrees C. in the presence of an oxidizing gas, also referred to as a regeneration gas, which contains about 0.1 to about 5 mole percent, and more preferably about 1 to about 3 mole percent, of oxygen based on the total moles of gases present in the regeneration zone. Thereafter, the cracking catalyst is returned to the reaction zone.

In the process for separating sulfur oxides from a gaseous mixture containing a sulfur oxide, the sulfur oxide is preferably absorbed by exposing the gaseous mixture to the dehydrated and collapsed composition described above. More preferably, the gaseous mixture contains about 0.1 to about 5, most preferably about 1 to about 3, mole percent oxygen. It is especially preferred that the process further comprises desorbing the sulfur oxide by contacting the collapsed and dehydrated composition with a reducing gas. Examples of suitable reducing gases include hydrogen, methane, ammonia and cracked hydrocarbons.

The process for the cyclic, fluidized catalytic cracking of a hydrocarbon feedstock including a sulfur-containing organic compound involves mingling the feedstock with a particulate cracking catalyst in a reaction zone as described above in reference to a hydrocarbon feedstock including a nitrogen-containing organic carbon. In this case, however, a coke is produced which contains chemically bound sulfur and volatile components. The cracking catalyst is separated from cracked hydrocarbons and exposed to a stripping gas stream to remove relatively more volatile components. The cracking catalyst is additionally passed to a regeneration zone to eradicate the sulfur and the relatively less volatile components by burning in the presence of an oxidizing gas, termed a regeneration gas.

The burning produces carbon oxides and sulfur oxides. In the regeneration zone, at least a portion of one of the sulfur oxides is absorbed by the above-described dehydrated and collapsed composition. Preferably, the dehydrated and collapsed composition is in the form of a fluidizable particulate solid. The cracking catalyst and preferably the dehydrated and collapsed composition are returned to the reaction zone.

In yet another preferred aspect, the invention is a process for simultaneously reducing the sulfur oxide and nitrogen oxide content of a gaseous mixture. A dehydrated and collapsed composition, which is described above, absorbs at least a portion of one of a sulfur oxide present in the gaseous mixture. Simultaneously, a nitrogen oxide of the gaseous mixture is substantially converted to nitrogen by exposure to the dehydrated and collapsed composition. Subsequently, the sulfur oxide is desorbed when the dehydrated and collapsed composition is contacted with a reducing gas.

The preferred conditions for absorbing the sulfur oxide and converting the nitrogen oxide to nitrogen include a temperature of about 300 to about 900 degrees C., more preferably about 260 to about 800 degrees C., and most preferably about 300 to about 600 degrees C. The preferred conditions also include an oxygen content in the gaseous mixture of about 0.1 to about 5 mole percent, more preferably about 1 to about 3 mole percent, and most preferably about 2 mole percent.

A highly preferred aspect of this invention comprises its use to reduce sulfur oxide emissions from catalyst regeneration in a cyclic, fluidized, catalytic cracking process. In this embodiment, a fluidizable particulate solid which comprises a dehydrated and collapsed composition is circulated through the fluidized catalytic cracking process in association with a particulate cracking catalyst. The collapsed composition is of the formula:

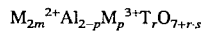

$$M_{2m}^{2+}Al_{2-p}M_p^{3+}T_rO_{7+r \cdot s}$$

The collapsed composition is substantially composed of microcrystallites of about 0.1 to about 30 nanometers. One portion of the microcrystallites are constituted by a solid solution phase having alumina oxide dispersed in a divalent metal monoxide crystal structure. Another portion of the microcrystallites is constituted by a spinel phase. Additionally, microcrystallites constituted by a trivalent metal oxide phase may be present. The phases are discernible by high resolution electron microscopy.

A feedstock is mixed with a particulate cracking catalyst in a reaction zone at a temperature in the range of about 430 degrees C. to about 730 degrees C. to produce cracked hydrocarbons. The contact with the cracking catalyst is preferably effected in one or more fluidized transfer line reactors at cracking temperature and at a fluidizing velocity which limits the cracking time to not more than about 10 seconds. Reaction zone effluent, comprises hydrocarbon vapors both cracked and uncracked, cracking catalyst and a carbonaceous material referred to as coke which contains sulfur, relatively volatile carbonaceous components and relatively less volatile carbonaceous components. A significant proportion of the coke adheres to the cracking catalyst.

The carbonaceous components of coke comprise highly condensed aromatic hydrocarbons which generally contain a minor amount of hydrogen, generally from about 4 to about 10 weight percent of hydrogen. When the hydrocarbon feedstock contains organic sulfur compounds, the coke also contains sulfur. As the coke builds up on the cracking catalyst, the activity of the catalyst for cracking and the selectivity of the cracking catalyst diminishes. The catalyst can, however, recover a major portion of its original capabilities by a suitable regeneration process.

Hydrocarbon vapors are separated from the cracking catalyst, and the cracking catalyst is stripped of volatile deposits before regeneration. The stripping zone can be suitably maintained at a temperature in the range of about 430 degrees C. to about 700 degrees C., preferably about 450 degrees to about 650 degrees C. and most preferably from about 765 degrees to about 595 degrees C. The preferred stripping gas is steam although inert gases, such as nitrogen or flue gases, or mixtures of steam with inert gases can also be used.

Stripped and partially deactivated cracking catalyst is regenerated by burning the coke deposits from the catalyst surface with a molecular oxygen containing regeneration gas, such as air, in a regeneration zone. This burning results in the formation of combustion products such as sulfur oxides, carbon monoxide, carbon dioxide and steam. The oxygen containing regeneration gas can contain relatively inert gases such as nitrogen, steam, carbon dioxide, recycled regeneration zone effluent and the like. The molecular oxygen concentration of the regeneration gas is ordinarily from 2 to about 30 volume percent and preferably from about 5 to about 25 volume percent. Since air is conveniently employed as a source of molecular oxygen, a major portion of the inert gas can be nitrogen. The regeneration zone temperatures are ordinarily in the range of about 565 degrees to about 790 degrees C., and are preferably in the range of about 620 degrees to about 735 degrees C.

The cracking catalyst is then returned to the reaction zone. The process also comprises removing the absorbed sulfur oxides from the particulate solid by exposing the particulate solid to the hydrocarbon feedstocks in the reaction zone. This is conveniently accomplished by recirculating the particulate solid to the reaction zone along with the regenerated cracking catalyst.

During the catalytic cracking of the hydrocarbon feedstock in the reaction zone absorbed sulfur oxides are substantially released from the particulate solid as sulfur containing gas comprising hydrogen sulfide. Similarly, subsequent steam stripping serves not only to remove the volatile coke components from the cracking catalyst, but also serves to complete the removal of any residual absorbed sulfur oxides from the particulate solid and complete the reactivation of the collapsed composition for further absorption of sulfur oxides in the regeneration zone. The resulting hydrogen sulfide is recovered together with other products from the reaction zone and stripping zones, and can be converted to elemental sulfur in facilities which are conventionally associated with a fluidized catalytic cracking unit.

The following Examples are not intended to limit the scope of the invention in any manner but, rather, are presented in order to better communicate certain aspects of the invention.

EXAMPLE 1

Preparation of a Layered Mixed Hydroxide
One liter of aleionized water, 15.90 grams (0.15 mol) of sodium carbonate, and 48.0 grams (1.2 mol) of sodium hydroxide were charged to a flask equipped with a mechanical stirrer and a water-cooled reflux condenser. One liter of deionized water, 102.56 grams (0.4 mol) of $Mg(NO_3)_2 \cdot 6H_2O$, 67.38 grams (0.1796 mol) of $Al(NO_3)_3 \cdot 9H_2O$, and 8.86 grams (0.0204) of $Ce(NO_3)_3 \cdot 6H_2O$ were blended and added dropwise to the flask with continuous stirring over a period of about one hour. The result was a gelatinous mixture of 10.74 pH which was heated under reflux while being swept with a nitrogen purge for about 15 hours at 85 degrees C. The mixture was subsequently cooled, filtered, washed repeatedly with deionized water, and dried overnight under vacuum at 70 degrees. The dried material was designated Sample A.

Sample A was analyzed by conventional x-ray diffraction techniques which produced the trace presented in FIG. 1. The trace includes peaks characteristic of a hydrotalcite structure having a d(001) value of 7.62 Angstrom units. Additionally, Sample A was analyzed for metals by inductively coupled plasma techniques and the metals were reported as 20.6 percent magnesium, 12.0 percent aluminum, 6.1 cerium, and 450 ppm sodium. The reported metals correspond to a hydrotalcite clay having the formula:

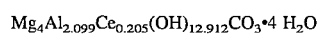

$$Mg_4Al_{2.099}Ce_{0.205}(OH)_{12.912}CO_3 \cdot 4\ H_2O$$

EXAMPLE 2

Calcination of a Layered Mixed Hydroxide at 450°
A portion of the dried material produced by the procedure described in Example 1 above was heated in air at a rate of about 20 degrees C. per minute until a temperature of 450 degrees C. was achieved. The material was held at 450 degrees for 15 hours and then cooled. The material calcined at 450 degrees was designated Sample B.

EXAMPLE 3

Calcination of a Layered Mixed Hydroxide at 850°
A portion of the dried material produced by the procedure described in Example 1 above was heated in air at a rate of about 20 degrees C. per minute until a temperature of 850 degrees was achieved. The material was held at 850 degrees for 15 hours and then cooled. The material calcined at 850 degrees was designated Sample C.

EXAMPLE 4

Vanadation of 450° Calcined Material
A solution was prepared by blending 0.23 grams of $NH_4VO_3$ with 6.22 grams of deionized water. The proportions of the solution had been carefully chosen to provide a pH in the range of about 6 to about 8 in order to stabilize metavanadate ions ($VO_3^{1-}$). The solution was thoroughly mixed with 4.82 grams of Sample B which was described in Example 2 above. The resulting mixtures was dried under vacuum at 70 degrees C. overnight and then calcined at 450 degrees to produce a vanadated material designated Sample D. Based on the proportions of reactants, it is estimated that the theoretical formula of Sample D is approximately:

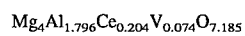

$$Mg_4Al_{1.796}Ce_{0.204}V_{0.074}O_{7.185}$$

Subsequent analyses of Sample D were reported as B.E.T. surface area of 192 m²/g, average pore radius of 81 Angstrom units, micropore area of 50 m²/g, and micropore volume of 0.023 cc/g.

EXAMPLE 5

Vanadation of 850° Calcined Material
The procedure of Example 4 was performed again except that Sample C described in Example 3 above was vanadated and calcined. The resulting material was designated Sample E. The estimated theoretical formula for Sample E is identical to the formula presented above for Sample D.

Subsequent analyses indicated that Sample E had a B.E.T. surface area of 119 m²/g, an average pore radius of 91 Angstrom units, a micropore area of 6 m²/g, and a micropore volume of 0.003 cc/g. High resolution electron photomicrogaphy of Sample D, supported by scanning electron microscope analyses, indicated that a significant fraction of the microcrystallites present were composed of a solid solution phase having aluminum oxide dispersed in a magnesium oxide crystal lattice.

EXAMPLE 6

Reactant Limited Vanadation

A relatively dilute vanadate solution was prepared by blending 0.11 grams of $NH_4VO_3$ with 4.0 liters of deionized water. The proportions of the solution had been chosen to provide a pH in the range which stabilizes the metavanadate form of the anion. The dilute solution was thoroughly mixed with 4.82 grams of Sample B which was described in Example 2 above. The resulting mixture was filtered, then dried under vacuum at 70 degrees C. overnight and calcined at 450 degrees to produce a partially vanadated material.

Based on the proportions of reactants, it is estimated that the theoretical formula of the partially vanadated material is approximately:

$$Mg_4Al_{1.796}Ce_{0.204}V_{0.035}O_{7.088}$$

EXAMPLE 7

Performance Testing of Sample D

A portion of Sample D which was described in Example 4 above was subjected to thermal gravimetric analysis during sequential periods of exposure to an oxidizing gas mixture including 5000 ppm sulfur dioxide, 2 percent oxygen and balance helium and to a reducing gas mixture including 50 percent hydrogen and balance helium. The temperature of the oxidizing gas was about 735 degrees C., while the temperature of the reducing gas was about 640 degrees C. Each exposure was preceded by a period of helium purge at the corresponding temperature.

Figure 2:
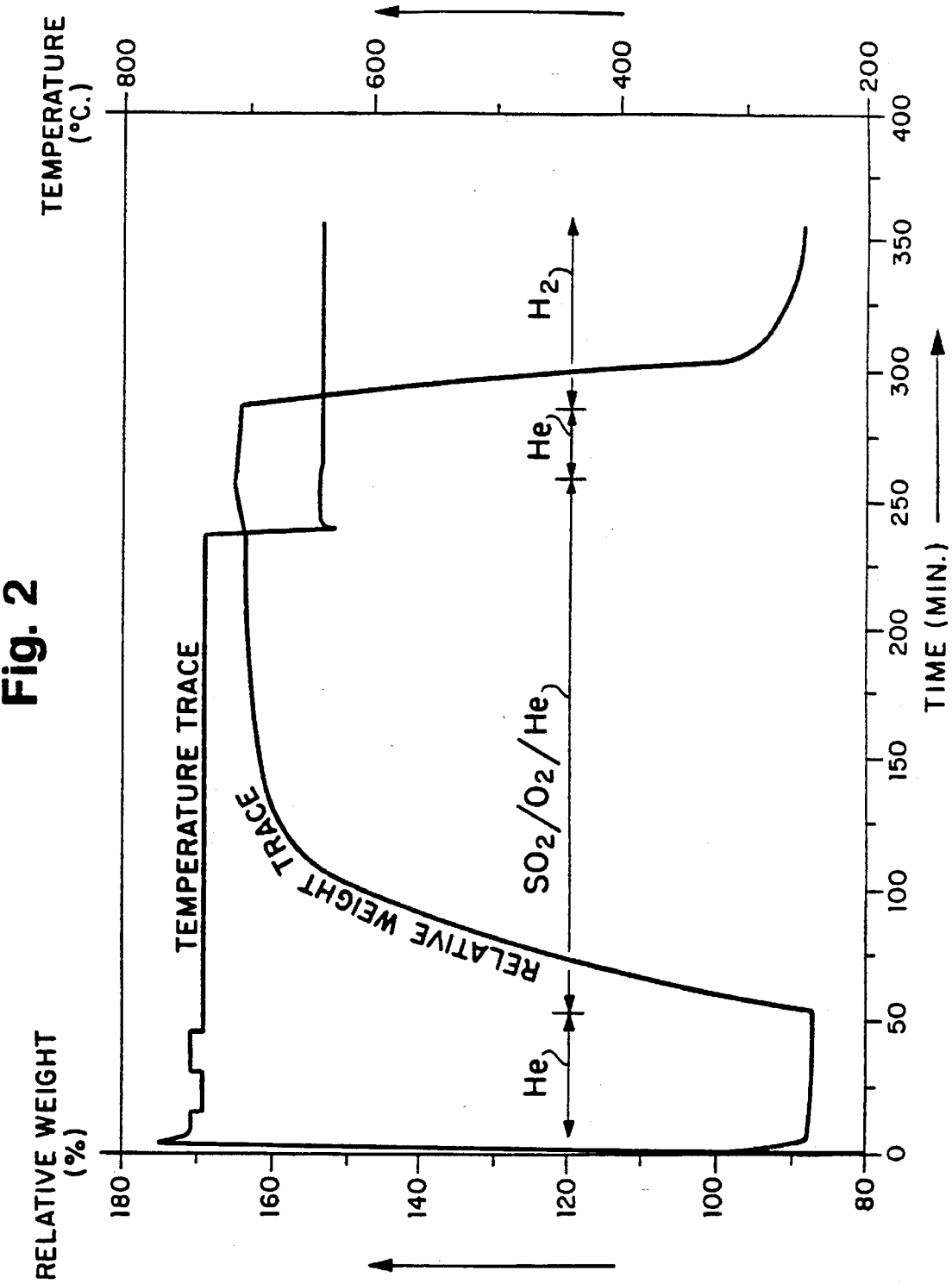
FIG. 2 is a dual-axis graph showing a relative weight for the product of Example 4 a function of time (in minutes) during the course of a thermal gravimetric analysis having a temperature trace which is also presented in FIG. 2.

The sample, which weighed 19.7363 milligrams at the outset, exhibited a relative weight increase of 84.6 percent during ninety minutes of exposure to the oxidizing gas mixture. An almost immediate relative weight decrease of 87.3 percent was observed on exposure to the reducing gas mixture. FIG. 2 depicts the relationship of relative sample weight, expressed as a percentage of the weight at the outset, to elapsed time in minutes for one oxidizing and reducing cycle of the thermal gravimetric analysis for Sample D.

EXAMPLE 8

Performance Testing of Sample E

Figure 3:
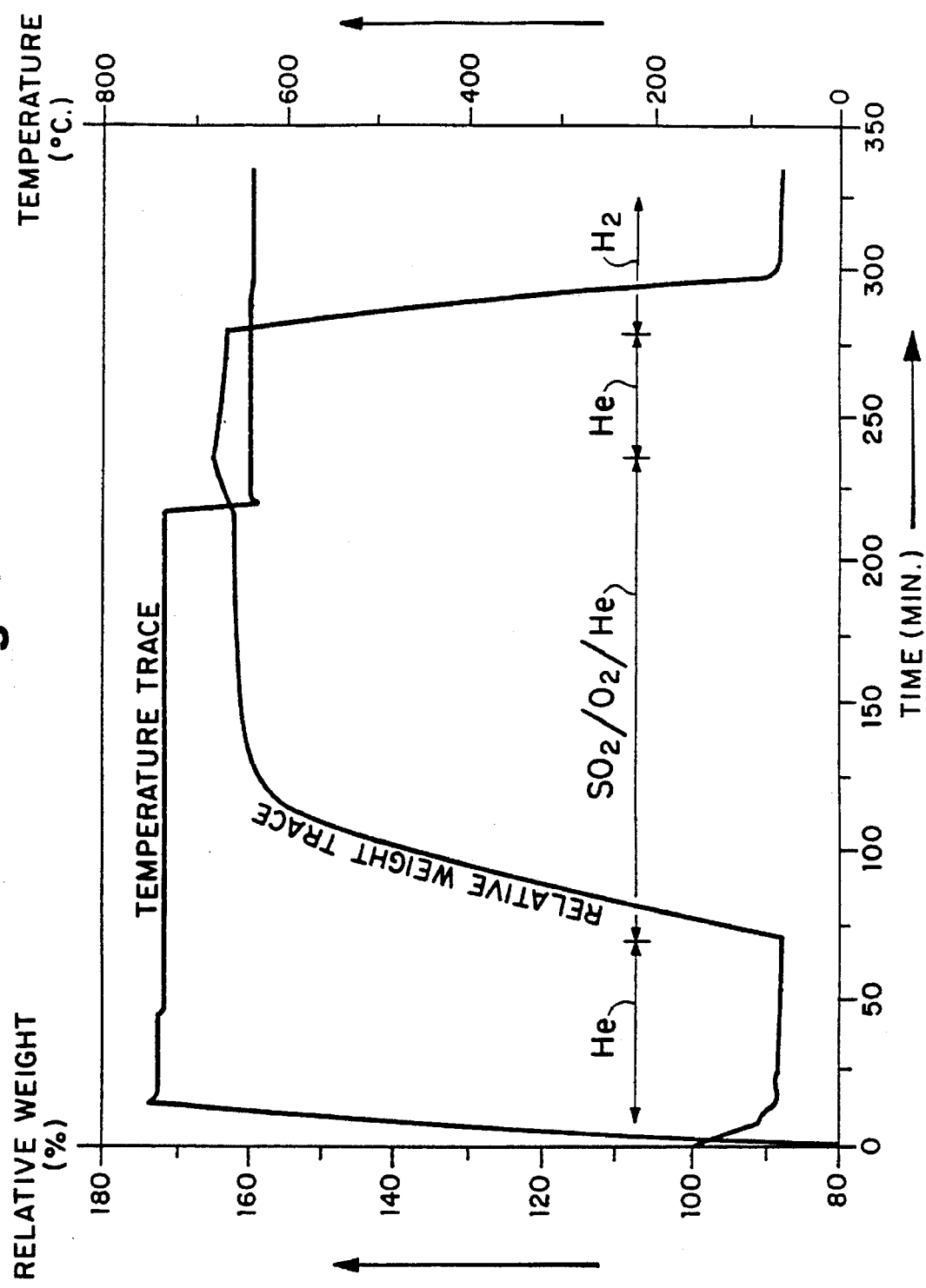
FIG. 3 is a dual-axis graph which depicts a relative weight for the product of Example 5 as a function of time during the course of a thermal gravimetric analysis having a temperature trace which is also presented in FIG. 3.

The procedure of Example 7 above was repeated with a portion of Sample E which was described in Example 5 above. The sample weighed 20.8923 grams at the outset. The sample increased in relative weight by 83.3 percent while exposed to the oxidizing gas mixture, and decreased in relative weight by 84.1 percent weight during the exposure to the reducing gas, based on the weight at the outset. FIG. 3 shows the relationship of relative sample weight, expressed as a percentage of the weight at the outset, to elapsed time in minutes for one oxidizing and reducing cycle of the thermal gravimetric analysis for Sample E.

Figure 4:
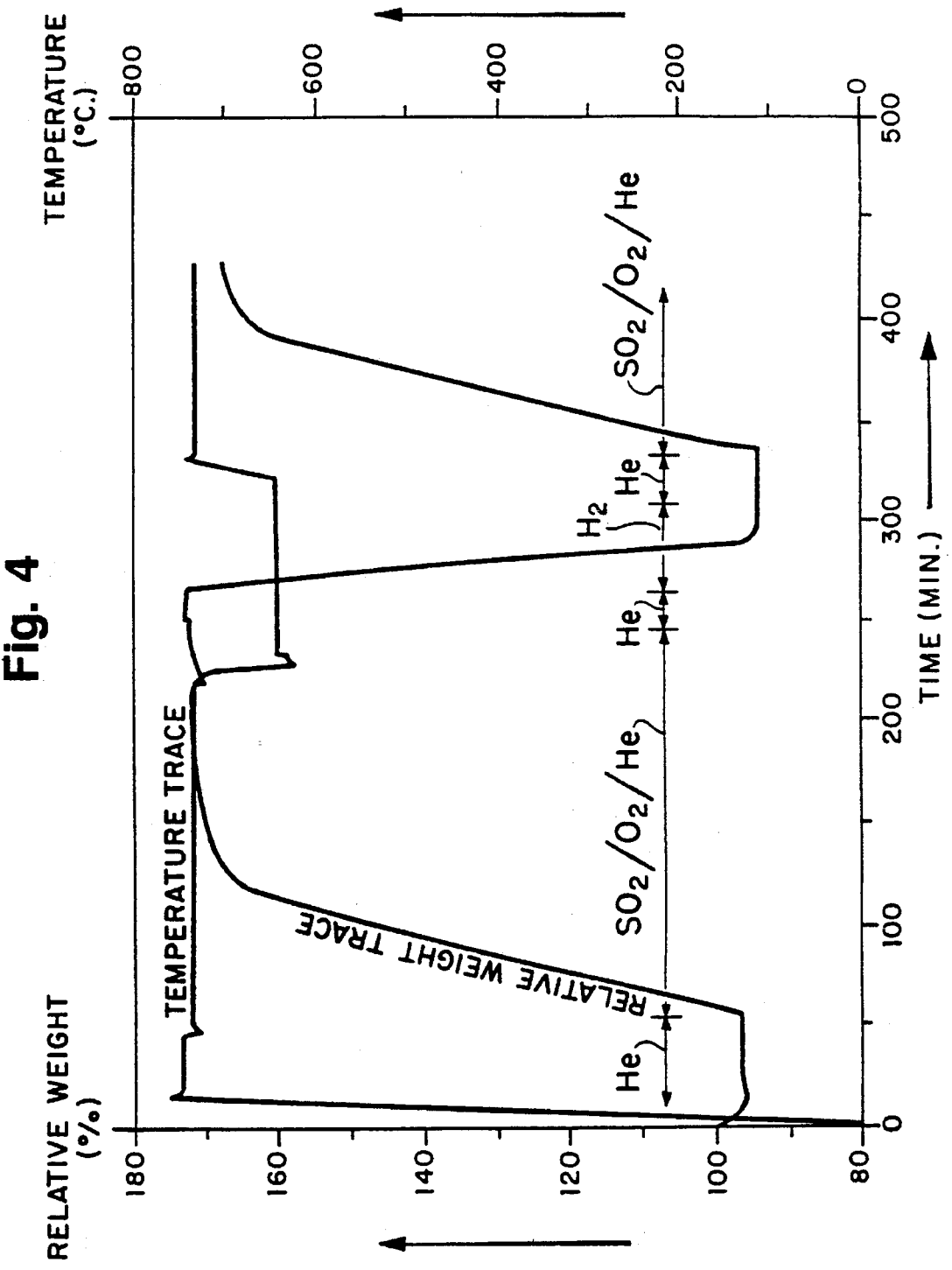
FIG. 4 is a dual-axis graph exhibiting a relative weight trace and a temperature trace for a second cycle and a third cycle of thermal gravimetric analysis performed on the product of Example 5.

Some of the Sample E material subjected to thermal gravimetric analysis was also tested for thermal gravimetric performance during a second oxidizing and reducing cycle and a third oxidizing and reducing cycle. The sample weight at the outset of the second cycle was 16.8988 milligrams, with the third cycle following immediately after the second. Relative sample weight as of a function of elapsed time as well as a temperature trace for the second and third cycles of Sample E is presented graphically in FIG. 4.

EXAMPLE 9

Performance Testing of a Spinel Absorbent

A widely used sulfur oxide absorbent based on a spinel composition was commercially obtained and designated Sample F for the purpose of performing a control experiment. Sample F is not of the present invention. However, Sample F was subjected to one oxidizing and reducing cycle of the performance test described in Example 7 and Example 8 above. Sample F exhibited a 47.0 percent increase in relative weight over a period of 90 minutes exposure to the oxidizing gas containing sulfur dioxide. Exposure to the reducing gas containing hydrogen caused an almost immediate relative weight decrease of 50.3 percent.

The results of performance testing produced in Example 7, Example 8 and Example 9 are presented in Table I, below.

TABLE I

| Absorbent Sample | Cycle | Relative Weight Increase (percent) | Time mins. | Relative Weight Decrease (percent) | Time mins. |
| --- | --- | --- | --- | --- | --- |
| D | 1 | 84.6 | 90 | 87.3 | rapid |
| E | 1 | 83.3 | 90 | 84.1 | rapid |
|   | 2 | 76.2 | 90 | 77.4 | rapid |
|   | 3 | 78.3 | 90 | not studied | — |
| F | 1 | 47.0 | 90 | 50.3 | rapid |

Inspection of Table I reveals that the absorbents prepared according to the present invention, Sample D and Sample E, demonstrated a significantly larger capacity for sulfur dioxide absorption than did the control sample, Sample F. Additionally, Sample E of the present invention continued to absorb more sulfur dioxide on its second and third oxidizing cycles than did control Sample F on its initial oxidizing cycle. The results are especially surprising because Sample F is a commercially obtained absorbent which is representative of widely accepted and currently utilized absorbent technology.

EXAMPLE 10

Nitrogen Oxide Reduction

A gas containing 270 molar ppm of nitrogen monoxide (NO), 540 molar ppm of carbon monoxide, and a balance of nitrogen is passed through a reactor at a series of reactor inlet temperatures ranging from 260 to 788 degrees C. The reactor is allowed to equilibrate at each inlet temperature, and Beckman 951 A NO/NOx analyzer indicates nitrogen monoxide (NO) content and nitrogen dioxide ($NO_2$) content downstream of the reactor. The reactor contains a calcined and vanadated material, essentially identical to the calcined and vanadated material described in Example 4, above. Space velocity is maintained at 520 per hour.

The reduction in total nitrogen oxides content is calculated for each inlet temperature. The calculated values for total nitrogen reduction are presented in Table II, below:

TABLE II

| Reactor Inlet Temperature (degrees C.) | Total Nitrogen Oxides Reduction (as a percentage inlet concentration) |
| --- | --- |
| 371 | 40 |
| 399 | 56 |
| 427 | 70 |
| 454 | 82 |
| 482 | 90 |

For the purposes of the present specification, "predominantly" is defined as mostly or more often than not. In quantative terms, predominantly denotes about 50 percent or more. "Substantially" is defined as being present in significant proportions or having sufficient frequency so as to measurably affect macroscopic qualities of an associated compound or system. Where the amount required for such significant and measurable impact is not clear, substantially is synonymous with about 20 percent or more. "Essentially" is defined as absolutely but allowing for some small variations which have a negligible effect on macroscopic qualities and final outcome. Variations of about one percent can often exist without any detectable change in essential qualities.

Examples have been presented and hypotheses advanced in order to better communicate certain facets of the invention. The scope of the invention is determined solely by the appended claims, and is not limited in any way by the examples or the hypotheses. Moreover, practitioners who study the teachings set forth above will undoubtedly receive suggestions which bring to mind many additional aspects of the invention. Such obviously similar aspects, whether or not expressly described herein, are intended to be within the scope of the present claims.

We claim as our invention:

1. A process for reducing at least one of (1) the sulfur oxide content of a sulfur-oxide containing gas, and (2) the nitrogen oxide content of a nitrogen oxide-containing gas which includes contacting said gas with a material at conditions effective to reduce at least one of (1) the sulfur oxide content of said gas and (2) the nitrogen oxide content of said gas, wherein at least a portion of said material is a composition produced by a process which comprises:

calcining at a temperature of at least about 450 degrees C. for about one hour or more a layered mixed hydroxide of the formula:

$$M_{2x}^{2+} Al_{2-n} M_n^{3+} (OH)_{4x+4} (J^v)_{\frac{k}{v}} (A^q)_{\frac{2-k}{q}} \cdot mH_2O$$

where $M^{2+}$ is a divalent metal selected from the group consisting of magnesium, calcium, zinc, barium and strontium;
x is about 1.1 to about 3.5;
$M^{3+}$ is a trivalent metal selected from the group consisting of cerium, lanthanum, iron, chromium, vanadium, and cobalt;
n is about 0.01 to about 0.4;
J is $VO_3$, $HVO_4$, $VO_4$, $V_2O_7$, $HV_2O_7$, $V_3O_9$, $V_4O_{12}$; $WO_4$, or $MoO_4$;
v is the net ionic charge associated with J;
k is about 0.01 to less than 2;
A is $CO_3$, OH, $SO_3$, $SO_4$, Cl, or $NO_3$;
q is the net ionic charge associated with A; and
m is a positive number;

to produce a dehydrated and at least partially collapsed composition which comprises solid solution microcrystallites having aluminum oxide dispersed in an oxide of the divalent metal and of spinel phase microcrystallites, each of the microcrystallites having the greatest linear dimension in the range of about 0.1 to about 30 nanometers.

2. The process of claim 1 wherein said gas contains a sulfur oxide, and said gas additionally contains about 0.1 to about 5 mole percent oxygen.

3. The process of claim 1 wherein said gas contains a nitrogen oxide, and said gas additionally contains a reducing agent in a molar concentration that is at least about equal to one-half of the molar concentration of the nitrogen oxide initially present in said gas.

4. The process of claim 3 wherein the reducing agent is selected from the group consisting of hydrogen, methane, carbon monoxide, ammonia, and sulfur dioxide.

5. A process for separating sulfur oxides from a gaseous mixture containing a sulfur oxide which comprises:

absorbing a sulfur oxide by exposing a gaseous mixture containing sulfur oxides with a dehydrated and collapsed composition comprising microcrystallites collectively of the formula:

$$M_{2m}^{2+} Al_{2-p} M_p^{3+} T_r O_{7+r \cdot s}$$

where m is about 1.1 to about 3.5;
p is about 0.01 to about 0.4;
$M^{2+}$ is a divalent metal selected from the group consisting of magnesium, calcium, zinc, strontium and barium;
$M^{3+}$ is a trivalent metal selected from the group consisting of cerium, lanthanum, iron, chromium, vanadium, and cobalt;
T is vanadium, tungsten or molybdenum;
r is about 0.01 to about 0.2; and
s is 2.5 when T is vanadium or 3 when T is tungsten or molybdenum;

wherein the microcrystallites comprise solid solution microcrystallites having aluminum oxide dispersed in an oxide of the divalent metal and of spinel phase microcrystallites, each of the microcrystallites having the greatest linear dimension in the range of about 0.1 to about 30 nanometers.

6. The process of claim 5 which further comprises desorbing the sulfur oxide by contacting the collapsed and dehydrated composition with a reducing gas.

7. The process of claim 5 which further comprises exposing a layered mixed hydroxide to the gaseous mixture containing sulfur oxides at a temperature in the range of about 450 degrees to about 1000 degrees C. to produce the collapsed and dehydrated composition.

8. The process of claim 5 wherein the gaseous mixture contains about 0.1 to about 5 mole percent oxygen.

9. A process for reducing (1) the sulfur oxides content and (2) the nitrogen oxides content of a gaseous mixture containing sulfur oxides and nitrogen oxides, which comprises:

a) absorbing a sulfur oxide by exposing a gaseous mixture containing sulfur oxides and nitrogen oxides to a dehydrated and collapsed composition comprising microcrystallites collectively of the formula:

$$M_{2m}^{2+} Al_{2-p} M_p^{3+} T_r O_{7+r \cdot s}$$

where m is about 1.1 to about 3.5;
p is about 0.01 to about 0.4;
$M^{2+}$ is a divalent metal selected from the group consisting of magnesium, calcium, zinc, strontium and barium;

$M^{3+}$ is a trivalent metal selected from the group consisting of cerium, lanthanum, iron, chromium, vanadium, and cobalt;

T is vanadium, tungsten or molybdenum;

r is about 0.01 to about 0.2; and s is 2.5 when T is vanadium or 3 when T is tungsten or molybdenum;

wherein the microcrystallites comprise solid solution microcrystallites having aluminum oxide dispersed in an oxide of the divalent metal and of spinel phase microcrystallites, each of the microcrystallites having the greatest linear dimension in the range of about 0.1 to about 30 nanometers;

b) chemically converting a nitrogen oxide to produce nitrogen by exposing the gaseous mixture to the dehydrated and collapsed composition; and c) desorbing the sulfur oxide by contacting the collapsed and dehydrated composition with a reducing gas.

10. The process of claim 9 wherein the sulfur oxide is absorbed and the nitrogen oxide is converted by exposing the gaseous mixture to the collapsed and dehydrated composition at a temperature in the range of about 200 to about 900 degrees C.

11. The process of claim 9 wherein the absorbing of the sulfur oxide and the converting of the nitrogen oxide take place in the presence of an oxidizing gas which contains about 0.1 to about 5 mole percent oxygen.

12. The process of claim 11 wherein the oxidizing gas contains about 1 to about 3 mole percent oxygen and is at a temperature of about 450 to about 800 degrees C.

13. The process of claim 9 which further comprises exposing a layered mixed hydroxide to the gaseous mixture containing sulfur oxides and nitrogen oxides at a temperature in the range of about 450 to about 1000 degrees C. to produce the collapsed and dehydrated composition.

14. The process of claim 9 wherein the desorbing produces sulfur compounds which include hydrogen sulfide.

* * * * *